United States Patent
Patel et al.

(10) Patent No.: US 9,448,698 B2
(45) Date of Patent: *Sep. 20, 2016

(54) FREE-FORM ENTRIES DURING PAYMENT PROCESSES

(71) Applicant: PAYPAL, INC., San Jose, CA (US)

(72) Inventors: Amol B. Patel, Los Altos, CA (US); Suraj S. Menon, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 307 days.

This patent is subject to a terminal disclaimer.

(21) Appl. No.: 14/047,724

(22) Filed: Oct. 7, 2013

(65) Prior Publication Data

US 2014/0040801 A1 Feb. 6, 2014

Related U.S. Application Data

(63) Continuation of application No. 12/730,101, filed on Mar. 23, 2010, now Pat. No. 8,554,280.

(51) Int. Cl.
| | |
|---|---|
| *H04B 1/38* | (2015.01) |
| *G06F 3/0484* | (2013.01) |
| *G06Q 20/32* | (2012.01) |
| *G06Q 20/38* | (2012.01) |
| *G06Q 30/04* | (2012.01) |
| *G06Q 30/06* | (2012.01) |
| *G06F 3/0488* | (2013.01) |
| *G10L 15/26* | (2006.01) |

(52) U.S. Cl.
CPC ......... *G06F 3/0484* (2013.01); *G06F 3/04883* (2013.01); *G06Q 20/32* (2013.01); *G06Q 20/3221* (2013.01); *G06Q 20/3223* (2013.01); *G06Q 20/381* (2013.01); *G06Q 30/04* (2013.01); *G06Q 30/06* (2013.01); *G10L 15/26* (2013.01)

(58) Field of Classification Search
CPC ............ G06Q 20/32; G06Q 20/3221; G06Q 20/3223; G06Q 20/381; G06Q 30/04; G06Q 30/06; G10L 15/26; G06F 3/04883; G06F 3/0484
USPC .................. 455/566, 440; 345/173, 179, 467
See application file for complete search history.

(56) References Cited

U.S. PATENT DOCUMENTS

| | | | | |
|---|---|---|---|---|
| 6,351,634 | B1 * | 2/2002 | Shin | G06F 3/04883 380/247 |
| 6,795,579 | B2 * | 9/2004 | Tang | G06K 9/00429 341/28 |
| 7,802,056 | B2 * | 9/2010 | Demsey | G06T 1/60 345/543 |
| 7,962,344 | B2 * | 6/2011 | Sharpe | G06F 3/167 379/88.28 |
| 7,965,293 | B2 * | 6/2011 | Fujiwara | G06T 11/60 345/467 |
| 8,041,397 | B2 * | 10/2011 | Nakanishi | G06F 9/45512 341/20 |
| 8,170,186 | B2 * | 5/2012 | Kuiken | G08C 17/00 379/102.02 |
| 2002/0107885 | A1 * | 8/2002 | Brooks | G06F 3/04883 715/224 |
| 2002/0196978 | A1 * | 12/2002 | Hawkins | G06K 9/00429 382/189 |
| 2003/0199295 | A1 * | 10/2003 | Vancura | G07F 17/3232 463/16 |

(Continued)

FOREIGN PATENT DOCUMENTS

EP 1 462921 * 9/2004 ............ G06F 3/003

*Primary Examiner* — Charles Shedrick
(74) *Attorney, Agent, or Firm* — Haynes & Boone, LLP

(57) ABSTRACT

Various methods and systems are provided that allow a user to perform a free-form action, such as making a mark on a device, speaking into a device, and/or moving the device, to cause a step to be performed that conventionally was performed by the user having to locate and select a button or link on the device.

23 Claims, 6 Drawing Sheets

(56) References Cited

U.S. PATENT DOCUMENTS

| | | | |
|---|---|---|---|
| 2005/0093845 A1* | 5/2005 | Brooks et al. | 345/179 |
| 2005/0266386 A1* | 12/2005 | Marggraff | G09B 19/12 434/317 |
| 2006/0001656 A1* | 1/2006 | LaViola, Jr. | G06F 3/04883 345/179 |
| 2006/0012577 A1* | 1/2006 | Kyrola | G06F 3/0416 345/173 |
| 2006/0052109 A1* | 3/2006 | Ashman, Jr. | G06F 1/1626 455/440 |
| 2006/0199605 A1* | 9/2006 | Lin | 455/550.1 |
| 2007/0082710 A1* | 4/2007 | Jang | G06F 3/04883 455/566 |
| 2009/0090567 A1* | 4/2009 | Tonouchi | G06F 3/017 178/18.03 |
| 2009/0222770 A1* | 9/2009 | Chang | G06F 3/04883 715/863 |
| 2010/0045627 A1* | 2/2010 | Kennedy | G06F 3/0416 345/173 |
| 2010/0127991 A1* | 5/2010 | Yee | G06K 9/00422 345/173 |
| 2011/0107216 A1* | 5/2011 | Bi | G06F 3/011 715/716 |
| 2011/0129168 A1* | 6/2011 | Lapstun | B41J 2/17503 382/313 |
| 2011/0216015 A1* | 9/2011 | Edwards | G06F 3/041 345/173 |

* cited by examiner

FREE-FORM ENTRIES DURING PAYMENT PROCESSES

CROSS REFERENCE TO RELATED APPLICATION

This application is a continuation of U.S. application Ser. No. 12/730,101, filed Mar. 23, 2010 which is incorporated herein by reference as part of the present disclosure.

BACKGROUND

1. Field of the Invention

The present invention generally relates to conducting a financial transaction on-line and in particular to conducting financial transactions using free-form entries to select desired actions.

2. Related Art

During a typical payment process flow, the user may be asked to authorize a payment or transmission before the transaction can be completed. Authorization may include the user selecting a specific button or link, such as "Pay Now," "Confirm," "Send," "Purchase," "Buy," etc. The user may also have the option of selecting a specific button or link to perform other actions, such as cancel the transaction (e.g., "Cancel"), continue shopping (e.g., "Continue"), save to cart or account (e.g., "Save"), etc. By selecting such buttons or links, which may be done by clicking or tapping, the desired information is conveyed to the recipient, typically a payment provider or merchant in a purchase transaction.

However, requiring the user to select a specific button can be inconvenient because the user has to look for, find, and select the button on the screen. This can be problematic with small screens, small buttons, and mobile devices in situations when the user or device is moving or non-stationary. As a result, the user may select the wrong button or spend extra time and effort to select the desired button. All this leads can lead to frustration by the user, cancellation of a purchase transaction, either intentional or inadvertent, hesitancy to engage in a future transaction, and other consequences that may be undesirable for the merchant, user, or payment provider.

In addition, simple selection of the buttons is a relatively mundane task, which while needed, may not be much fun for the user.

Therefore, a need exists for ways in which a user can make selections on a device that overcomes the disadvantages mentioned above.

SUMMARY

According to one embodiment of the disclosure, a user places a check mark or "V" anywhere on the display to convey an approval and an "X" anywhere on the display to cancel a transaction or process. For a touch-screen display, the user simply swipes the screen with the user's finger to place the desired mark on the display. In other types of displays, the user may use a stylus, mouse, track ball, or other means suitable to the display. Once the mark is placed, the corresponding action is performed. For example, when a user is ready to make a payment, typically conveyed by clicking a "Pay" button, the user may simply place a check mark on the screen instead of looking for and selecting the specific button.

In other embodiments, different "free-form" marks or actions can be used to convey information typically conveyed through one or more buttons or links. Examples include drawing a currency symbol to show a currency conversion from the current currency to the swiped currency or to send a payment using the currency that was swiped, shaking the mobile device to cancel the current transaction, and double tapping the screen to skip a review screen and proceed directly to checkout. The "free-form" actions can also be verbal. For example, the user may say "checkout" or other word or phrase to complete or initiate a checkout, "cancel" or "end" to cancel or restart a transaction, or other suitable words during various stages of a process or transaction. In another embodiment, the action may be shaking the device to cancel or restart a transaction.

Thus, the user is provided a fun and easy way to handle various stages of a transaction on a user device, without having to find and select specific buttons or links.

These and other features and advantages of the present invention will be more readily apparent from the detailed description of the embodiments set forth below taken in conjunction with the accompanying drawings.

Figure 1:
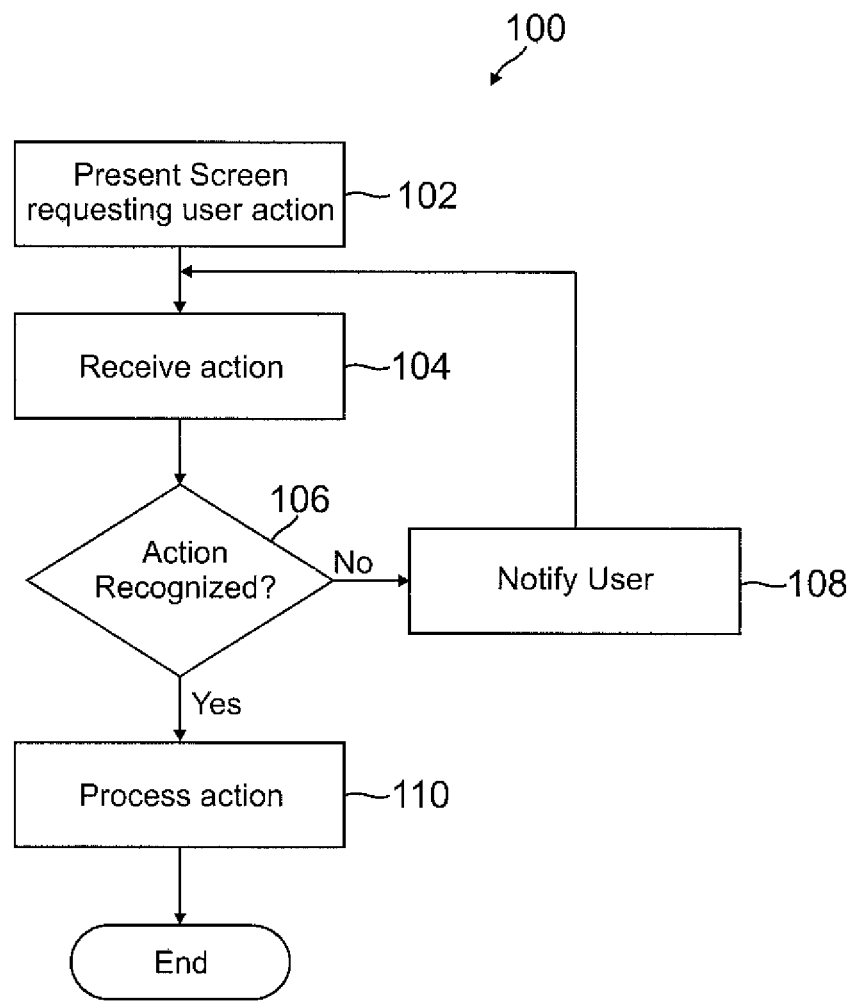
FIG. 1 is a flowchart showing a process an entity performs for processing a user request using a free-form action according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing a process an entity performs for processing a user request using a free-form action according to one embodiment of the present disclosure. The entity may be any type of system or person who processes a user action, such as a financial institution, a payment provider (e.g., PayPal, Inc. of San Jose, Calif.), a merchant or retailer site, an on-line marketplace, a social networking site, a hospital, a government agency, etc. At step 102, the entity presents a screen or display to the user requesting the user for some type of action. This may be part of a payment, shopping, on-boarding, or any suitable process that requires the user to perform an action. The action may include, but is not limited to, confirming a transaction, canceling a transaction, continuing a transaction, initiating a transaction, converting a currency, or skipping a step in a process. Transactions may be payment, shopping, financial, or any other suitable transaction.

The screen presented to the user at step 102 may be in response to a request from the user, such as initiating a transaction, or as part of, including completion of, a transaction. The screen is presented on a user device having a display that allows the user to perform a free-form action, which may include making a mark on the display, inputting an audio word or phrase, or shaking or moving the user device. Examples of suitable devices may be a PC, smart phone, laptop, or other computing device. The device may have a touch-screen display, such as an iPhone by Apple, or displays in which the user can speak a command into the device or make a mark, such as with a stylus, mouse, track ball, track pad, or other means.

In response to seeing the screen requesting the user for an action, the user performs a free-form action. In one embodiment, the user swipes a check mark or "V" on the screen, such as with the user's finger or a mouse. Other free-form actions may include marks such as an "X," a slash "\" or "/", a currency symbol, or any other suitable mark. In different embodiments, the free-form action may also be or alternatively be a voice command, such as "cancel," "continue," "yes," "no," "confirm," etc. or a movement, such as shaking the device to cancel or restart a transaction. Thus, the user device must be capable of processing the free-form action and transmitting it to the entity or system processing the transaction. For swipes and other movements, the device detects the movement on or through the display and converts the movement to a signal for transmission. For audio actions, the device converts the audio command to a signal for transmission. For movements, an accelerometer or other motion-sensing device processes the detected motion and converts the motion to a signal for transmission. Such methods are conventionally known. Transmission may be through any suitable communication medium, such as through the Internet via a wired or wireless connection.

Once the user performs the free-form action, the corresponding signal is transmitted to and received, at step 104, by the system processing the transaction. The system then determines, at step 106, whether the user action is recognized. An unrecognizable action may be the result of the user performing a proper action, but in a way that is unrecognizable to the system. For example, if the user was intending to swipe a check mark, that action may be unrecognizable because the check mark was made in an area outside an acceptable area of the user display, the mark was made too quickly for the device to properly process it, and/or the mark was not made properly (e.g., lines not straight enough or broken). The action may also be unrecognizable because it was not an action accepted by the system, e.g., the user swiping a circle when a circle does not correspond to anything in the system, the user saying "Commence" when that word does not correspond to anything in the system, or the user shaking the device in a circle when the device only recognizes an up and down motion.

If the user action received at step 104 is determined as one that is not recognized by the system, the system notifies the user at step 108. The notification may be a text or audio message informing the user that the action was not accepted or recognized. The user may re-enter the action if requested by the system. The number of re-entries, which can be zero, may be limited, as determined by the system.

If the action is recognized by the system, as determined at step 106, the action is processed at step 110. Some examples of actions include, but are not limited to, confirm a payment, send a payment, cancel a transaction, convert a currency, send a payment in a selected currency, initiate a checkout process, approve a transaction, and cancel a payment. After processing, the user may be sent a message about the status of the action, e.g., that the payment was successfully transmitted. This can be through any means, such as a text message, email, recorded voice message, etc.

Figure 2:
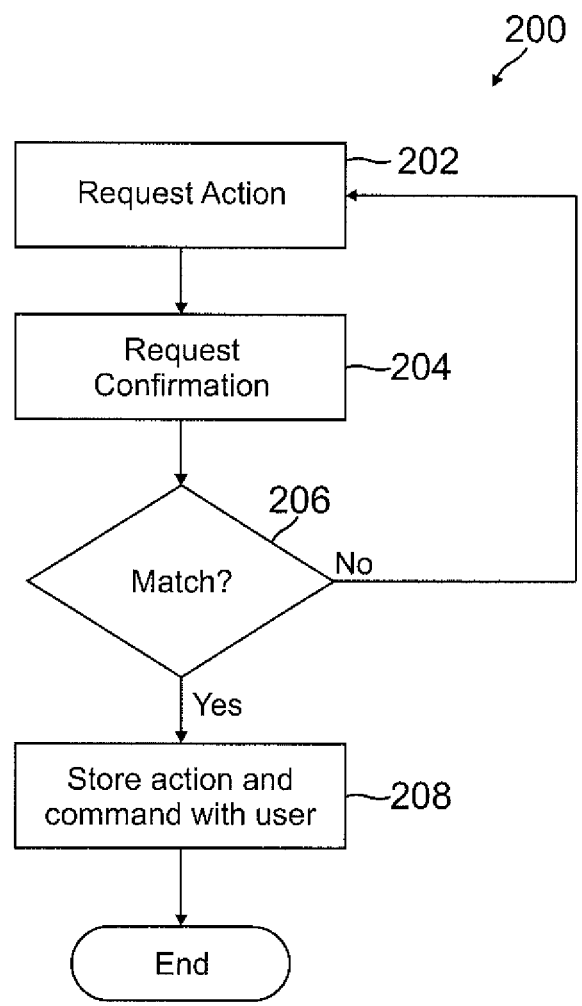
FIG. 2 is a flowchart showing a process an entity performs for associating a user with specific free-form actions according to one embodiment.

FIG. 2 is a flowchart 200 showing a process an entity performs for associated a user with specific free-form actions according to one embodiment. This process may or may not be performed. However, this process may be performed such that variations of certain free-form actions can be taken into consideration so that variations from user to user are still recognized by the entity. For example, one user may draw a check mark fast and with very straight lines, while another user may draw a check mark slowly and with crooked lines. Thus, the process in flowchart 200 may allow a system, such as one that process or converts actions on the device to a suitable transmission signal, to better interpret specific user actions.

At step 202, the user is requested to enter a specific action that is to be recognized by the system and/or entity processing the action request, such as PayPal, Inc. For example, the user may be requested to draw a check mark, "X," "$," "£" or other visual mark, say "Cancel," "Approve," "Checkout," or other audio comments, or move the device in an up and down motion, side to side motion, or other physical movement. The user does the requested action, which is processed by the system. Next, at step 204, the user is asked to repeat the action for confirmation. The user repeats the action requested from step 202, and the system processes the repeated action.

A determination is then made at step 206 whether the action in step 202 and the action in step 204 matches. Determining a match between two actions can be done with conventional and known methods and algorithms. The system may decide how much variation is acceptable between the two actions. For example, with a mobile device, the system may be willing to accept wider variations than with a PC or laptop because the user and/or device may be moving when the action is being performed.

If the two actions to not match, the user may be requested to enter and re-enter the action again. This may be beneficial if the first entered action at step 202 was incorrect or not what the user intended. In other embodiments, the user may be asked only to repeat or re-enter the action at step 204. Once there is a match, the action, which may from step 202, step 204, or a combination of steps 202 and 204, is stored with the system at step 208. The stored action is associated with the specific user. Thus, when a user logs into the system, the user can match the user action with what is stored for that user, resulting in a system that may be more reliable, with less errors and unrecognizable actions.

Figure 3B:
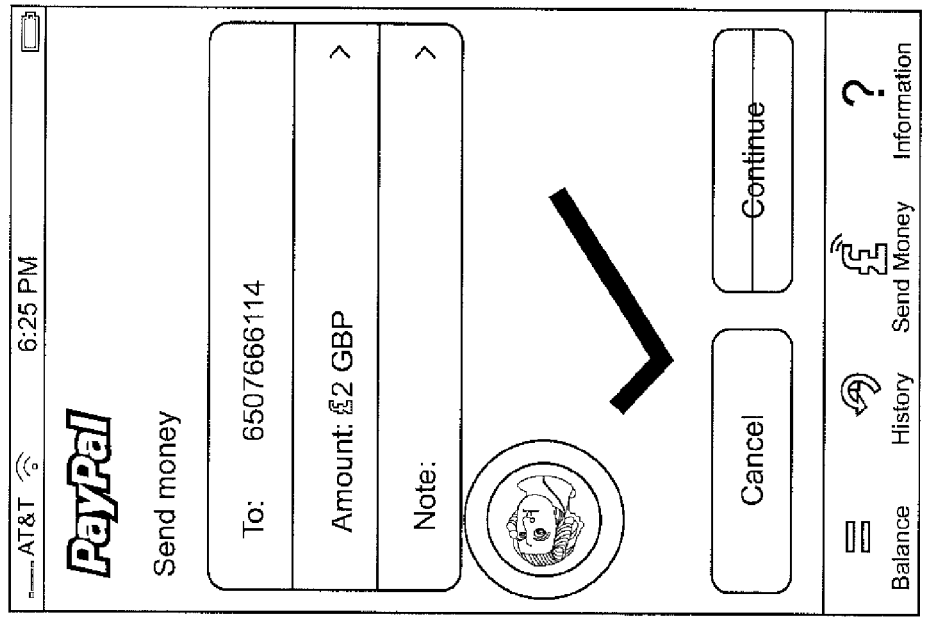
FIGS. 3A-3F show various examples of free-form actions on a device.
Figure 3A:
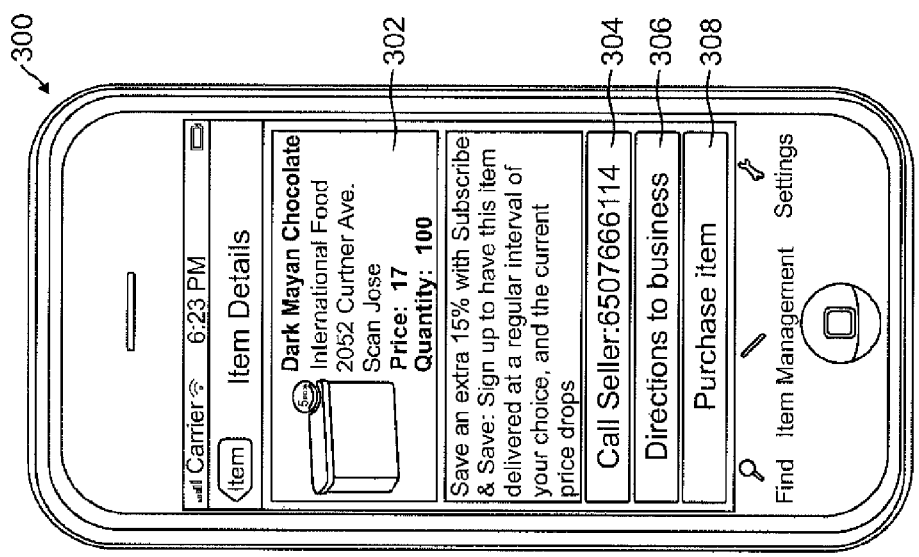

FIGS. 3A-3F show various examples of using a free-form action on a device. In FIG. 3A, a typical user device is shown as a smart phone 300, such as an iPhone from Apple. The display shows an item for sale 302, along with a button for calling the seller 304, a button for directions to the seller 306, and a button for purchasing the item 308. Conventionally, if the user wants to purchase item 302, the user selects purchase button 308, such as by tapping on the button. However, as discussed above, it may be difficult or inconvenient for the user to locate and then tap the button, especially if the user and/or device is moving. In addition, the user may inadvertently select directions button 306. Using a free-form action, the user may simply swipe or draw a check mark on the display to perform the same function as purchase button 308. The swipe may be on a specific area of the display or anywhere on the display. If the user wishes to cancel the current screen or re-start a search, the user may swipe or draw an "X" on the display.

FIG. 3B shows an example where the user draws a check mark on the display. This may function the same as if the user selected the "Continue" button. In other words, by drawing a check mark, the payment process may continue with the payment process instead of having to locate and select the "Continue" button.

Figure 3C:
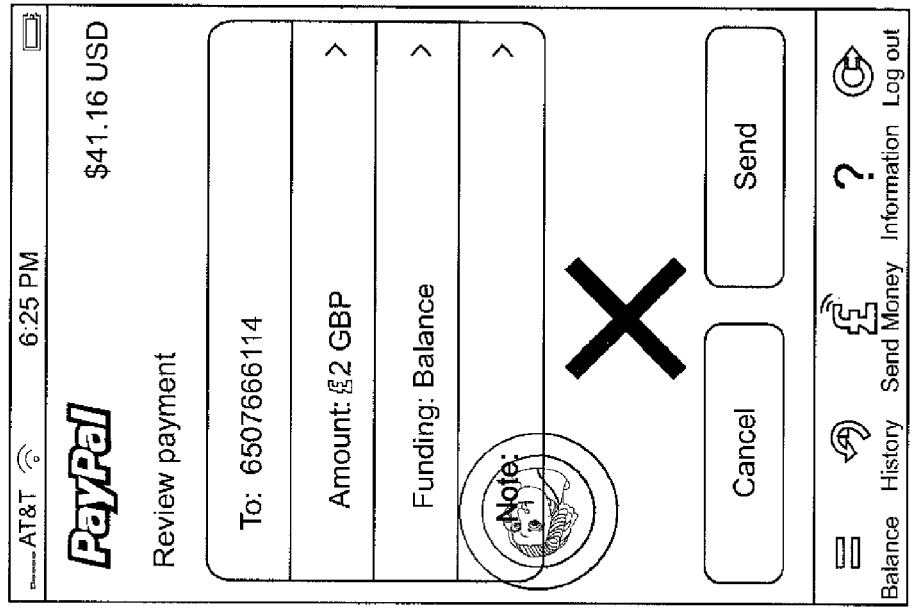
Figure 3D:
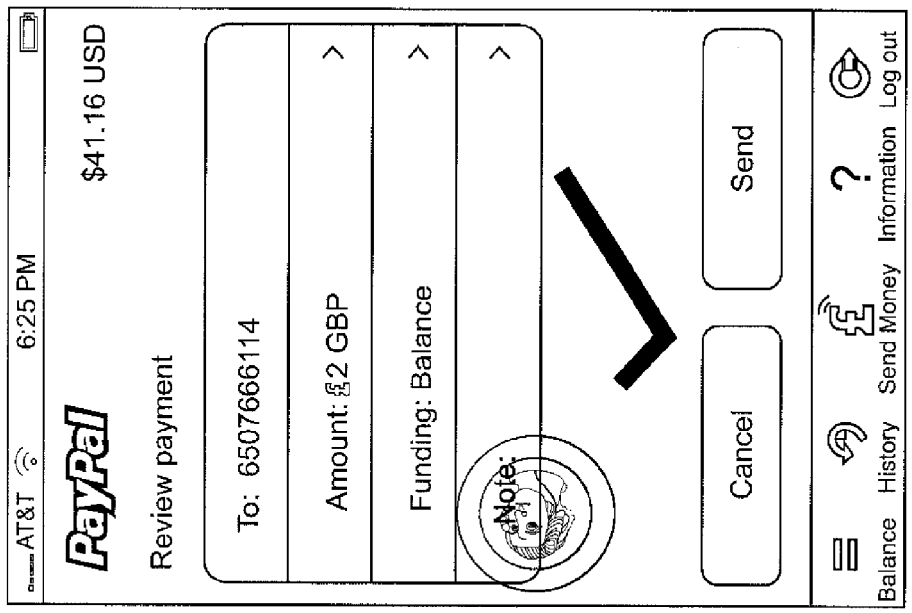

FIGS. 3C and 3D shows displays where the user is asked to review the payment information and either cancel to payment or send the payment. In FIG. 3C, the user may draw a check mark to send the payment without selecting the "Send" button. In FIG. 3D, the user may draw an "X" mark to cancel the payment without selecting the "Cancel" button.

Figure 3F:
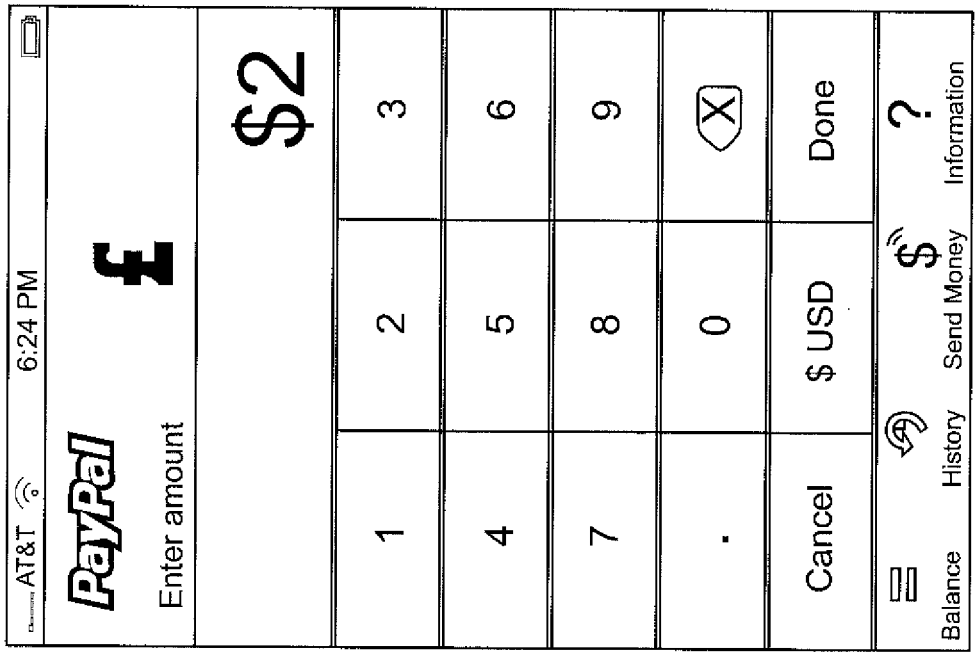
Figure 3E:
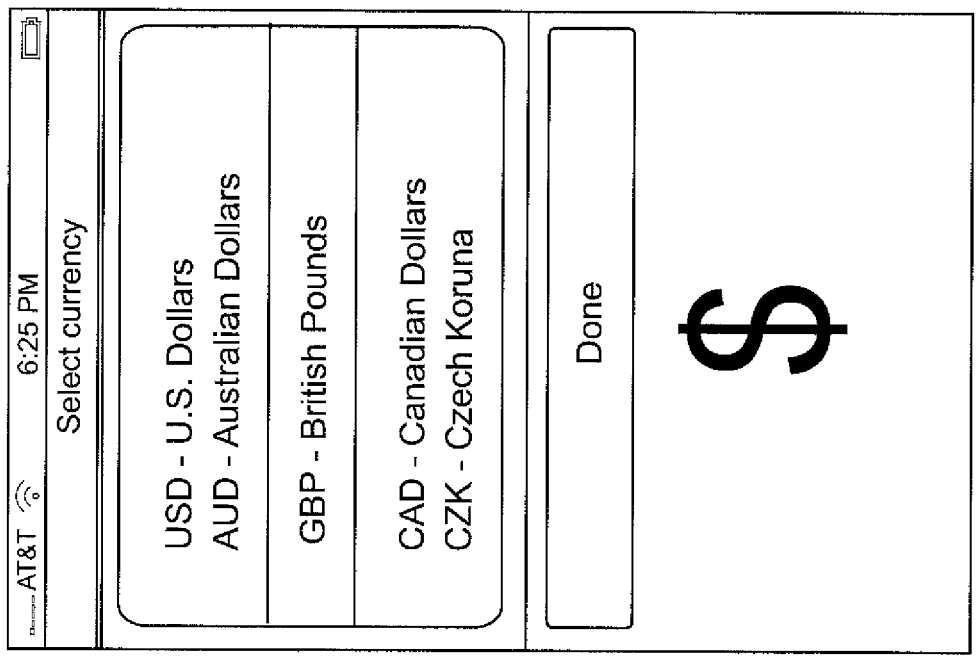

FIGS. 3E and 3F shows examples of drawing a currency symbol as a free-form action. In FIG. 3E, the user draws a U.S. dollar sign ($), instead of scrolling through different selections, to choose the transaction be conducted with U.S. dollars. Using a scroll wheel may be cumbersome and inefficient, as the user may scroll through the desired selection, or incorrectly select an adjacent selection. Drawing the currency symbol may also eliminate the need for the user to select the "Done" button, although in some embodiments, the user may still be required to select the "Done" button to proceed. In FIG. 3F, the user draws an English pound sign (£) to change the currency from U.S. dollars to English pounds.

Thus, using different free-form actions, such as marks/symbols, vocal commands, or physical device movements, the user may cause an action to be performed without having to locate and select a specific button or link on the device.

Figure 4:
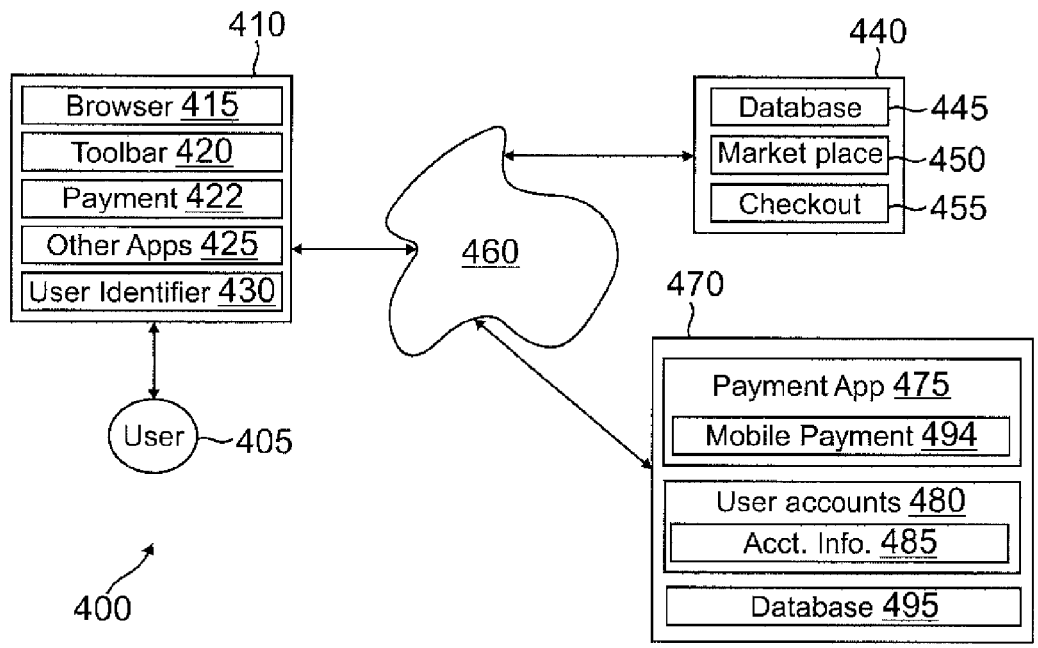
FIG. 4 is a block diagram of a networked system configured to handle a transaction using free form actions according to one embodiment.

FIG. 4 is a block diagram of a networked system 400 configured to handle a transaction using free-form actions, such as described above, in accordance with an embodiment of the invention. System 400 includes a user or consumer device 410 associated with a user 405, a merchant server 440, and a payment service provider server 470 in communication over a network 460. Payment service provider server 470 may be maintained by a payment provider, such as PayPal, Inc. of San Jose, Calif.

User device 410, merchant server 440, and payment service provider server 470 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

Network 460 may be implemented as a single network or a combination of multiple networks. For example, in various embodiments, network 460 may include the Internet or one or more intranets, landline networks, wireless networks, and/or other appropriate types of networks.

User device 410 may be implemented using any appropriate combination of hardware and/or software configured for wired and/or wireless communication over network 460. For example, in one embodiment, user device 410 may be implemented as a smart phone of user 405 in communication with the Internet, where user 405 is typically a person. In other embodiments, user device 410 may be implemented as a personal digital assistant (PDA), notebook computer, PC and/or other types of computing devices having an interactive display and capable of wireless computing, data transmission, and data receiving.

As shown, user device 410 may include one or more browser applications 415 which may be used, for example, to provide a convenient interface to permit user 405 to browse information available over network 460. For example, in one embodiment, browser application 415 may be implemented as a web browser configured to view information available over the Internet, such as a merchant site or shopping site. User device 410 may also include one or more toolbar applications 420 which may be used, for example, to provide client-side processing for performing desired tasks in response to operations selected by user 405. In one embodiment, toolbar application 420 may display a user interface for registering free-form actions and/or in connection with browser application 415 as further described herein.

In addition, user device 410 may include a payment application 422 that enables payments to be processed, sent, and/or received by the device. Payment processing may be with a merchant or individual.

User device 410 may further include other applications 425 as may be desired in particular embodiments to provide desired features to user device 410. For example, applications 425 may include security applications for implementing client-side security features, programmatic client applications for interfacing with appropriate application programming interfaces (APIs) over network 460, or other types of applications. Applications 425 may also include display and processing of images on the device display, such as the above-described display that allow the user to enter free-form actions. Furthermore, applications 425 may allow processing of audio, motion, or other visual marks on the device. User device 410 may include one or more user identifiers 430 which may be implemented, for example, as operating system registry entries, cookies associated with browser application 415, identifiers associated with hardware of user device 410, or other appropriate identifiers, such as used for payment/user/device authentication. In one embodiment, user identifier 430 may be used by a payment service provider to associate user 405 with a particular account maintained by the payment service provider as further described herein.

Merchant server 440 may be maintained, for example, by an on-line merchant or shopping site offering various products and/or services in exchange for payment, which may be received over network 460. Merchant server 440 may include a database 445 identifying available products and/or services (e.g., collectively referred to as items) which may be made available for viewing and purchase by user 405. Accordingly, merchant server 440 also includes a marketplace application 450 which may be configured to serve information over network 460 to browser 415 of user device 410. In one embodiment, user 405 may interact with marketplace application 450 through browser applications over network 460 in order to view various products or services identified in database 445.

Merchant server 440 may also include a checkout application 455 configured to facilitate the purchase by user 405 of goods or services identified by marketplace application 450. Checkout application 455 may be configured to accept payment information from user 405 and/or from payment service provider server 470, through any number of different funding sources, over network 460. If desired, checkout application 455 or another application may also be configured to process or recognize free-form actions from user 405 that is conveyed through user device 410 to merchant server 440.

Payment service provider server 470 may be maintained, for example, by an online payment service provider which may provide payment on behalf of user 405 to the operator of merchant server 440 or to another user, such as for person to person payments. Payment service provider server 470 may include one or more payment applications 475 configured to interact with user device 410 and/or merchant server 440 over network 460 to facilitate the purchase of goods or services by user 405 of user device 410 from merchant server 440 or another user, as well as transfer money between entities or individuals.

Payment service provider server 470 also maintains a plurality of user accounts 480, each of which may include account information 485 associated with individual users. For example, account information 485 may include private or sensitive information of users of devices such as account numbers, passwords, phone numbers, credit card information, bank information, user-selected patterns or other financial information which may be used to facilitate online transactions by user 405. Advantageously, payment application 475 may be configured to interact with merchant server 440 on behalf of user 405 during a transaction with checkout application 455 to track and manage purchases or money transfers made by users.

Payment application 475 may include a mobile payment processing application 494 which may be configured to receive information from a mobile user device and/or merchant server 440 for storage in a payment database 495. Payment application 475 may be further configured to match data received from a mobile device with information stored in payment database 495 for payment authentication and processing. This data may include the user's device phone number, email, password, and/or PIN. If free-form actions are to be converted and processed by the payment service provider, one or more free-form action applications 496 may also be included as part of or separate from payment application 475. Free-form applications may register, associate, and/or convert user actions on the user device as discussed above.

Figure 5:
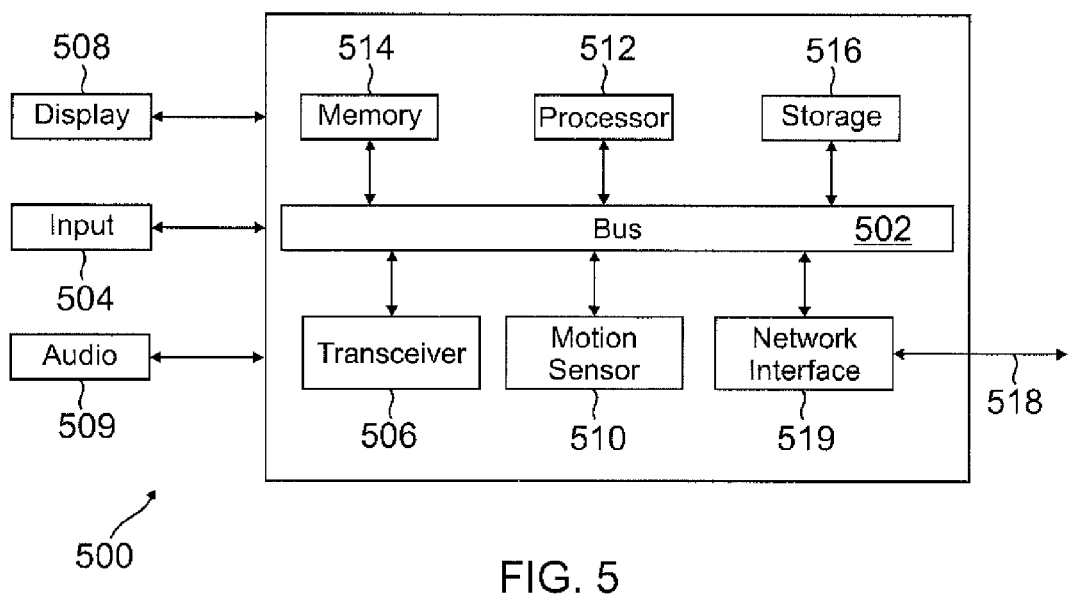
FIG. 5 is a block diagram of a computer system suitable for implementing one or more components according to one embodiment.

FIG. 5 is a block diagram of a computer system 500 suitable for implementing one or more embodiments of the present disclosure. In various implementations, the user device may comprise a personal computing device (e.g., a smart phone, laptop, personal computer, PDA, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 500 in a manner as follows.

Computer system 500 includes a bus 502 or other communication mechanism for communicating information data, signals, and information between various components of computer system 500. Components include an input component 504 that processes a user action, such as selecting keys from a keypad/keyboard, selecting one or more buttons or links, etc., and sends a corresponding signal to bus 502. A transceiver 506 transmits and receives signals between computer system 500 and other devices, such as a merchant server, payment provider server, or another user device. In one embodiment, the transmission is wireless, although other transmission mediums and methods may also be suitable. A display 508, such as an LCD or touch screen, is suitable for displaying an image (e.g., a step in a transaction, such as a payment transaction) and receiving a user action on that image (e.g., a user mark or swipe), such as described above. An audio component 509, such as a microphone, processes audio or voice commands, and a motion sensing component 510, such as an accelerometer, senses and process device movements from the user, again such as described above. A processor 512, which can be a microcontroller, digital signal processor (DSP), or other processing component, processes various signals from display 508, audio component 509, and motion sensing component 510, for transmission to other devices via a communication link 518 through a network interface 519.

Components of computer system 500 also include a system memory component 514 (e.g., RAM) and a static storage component 516 (e.g., ROM), which can be used to store free-form actions associated with a user. Computer system 500 performs specific operations by processor 512 and other components by executing one or more sequences of instructions contained in system memory component 514. Logic may be encoded in a computer readable medium, which may refer to any medium that participates in providing instructions to processor 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that comprise bus 502. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. Secure storage elements may be present within or apart from a main storage.

In various embodiments, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another, such as processing free-form actions performed by the user as part of a transaction process.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, non-specific free-form actions may also be suitable to replace having to locate and select buttons. An action, such as a double-tap by the user on the device, may function the same as bypassing a review screen and directs the user immediately to an end step of the process. Furthermore, the above has described several examples of free-form actions, but ones not described may also be part of the invention, with the concept that some sort of recognizable free-form action can replace the function of locating and selecting a button or link on a device for performing the appropriate action during a transaction. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer system comprising:
    a non-transitory memory storing a free-form action from a user corresponding to a unique action associated with a button or link, wherein the free-form action is a specific physical movement to a device or a mark detected by the device made by the user; and
    one or more hardware processors configured to execute instructions to cause the system to perform operations comprising:
        receiving a first free-form action corresponding to an action of a button or link from the user through the device; and
        determining the first free-form action matches the free-form action stored in the non-transitory memory based at least in part on a type of the device.

2. The computer system of claim 1, the operations further comprising:
    receiving a second free-form action from the user; and
    determining the first free-form action and the second free-form action match based at least in part on the type of the device.

3. The computer system of claim 1, wherein the device is a smart phone.

4. The computer system of claim 1, wherein the device is a tablet.

5. The computer system of claim 2, the operations further comprising:
    requesting the user to perform the second free-form action to repeat the first free-form action.

6. The computer system of claim 2, wherein the second free-form action and the first free-form action comprise marks made by the user on a display of the device.

7. The computer system of claim 1, wherein the determination is based, in part, on whether the user device is a mobile device or a laptop.

8. The computer system of claim 2, wherein when the second free-form action does not match the free-form action, the operations further comprise:
    requesting the user to perform a third free-form action to repeat the first free-form action.

9. The computer system of claim 2, wherein when the second free-form action does not match the first free-form action, the operations further comprise:
    requesting the user to perform and repeat a free-form action.

10. A method comprising:
    receiving a first free-form action corresponding to a unique action associated with a button or link from a user through a device, wherein the free-form action is a specific physical movement to the device or a mark detected by the device made by the user; and
    determining the first free-form action matches a free-form action stored in an account of the user with a service provider based at least in part on a type of the device.

11. The method of claim 10, further comprising:
    receiving a second free-form action from the user through the device; and
    determining the first free-form action and the second free-form action match based at least in part on the type of the device.

12. The method of claim 11, further comprising:
    requesting the user to perform the second free-form action to repeat the first free-form action.

13. The method of claim 11, wherein the second free-form action and the first free-form action comprise marks made by the user on a display of the device.

14. The method of claim 10, wherein the determining is based, in part, on whether the user device is a mobile device or a laptop.

15. The method of claim 11, wherein when the second free-form action does not match the free-form action, further requesting the user to perform a third free-form action to repeat the first free-form action.

16. The method of claim 11, wherein when the second free-form action does not match the first free-form action, further requesting the user to perform and repeat a free-form action.

17. A non-transitory machine-readable medium having stored thereon machine-readable instructions executable to cause a machine to perform operations comprising:
    requesting a user to perform a first free-form action through a device corresponding to an action associated with a button or link;
    receiving the first free-form action, wherein the first free-form action is a specific physical movement to the device or a mark detected by the device made by the user;
    receiving a second free-form action through the device;
    determining the first free-form action and the second free-form action match based at least in part on a type of the device; and
    processing the action associated with the button or link, wherein the action associated with the button or link uniquely depends and is based on the specific physical movement of the device or a mark detected by the device by the user.

18. The non-transitory machine-readable medium of claim 17, the operations further comprising:
    receiving a second free-form action from the user through the device; and
    determining the first free-form action and the second free-form action match based at least in part on the type of the device.

19. The non-transitory machine-readable medium of claim 18, the operations further comprise:
    requesting the user to perform the second free-form action to repeat the first free-form action.

20. The non-transitory machine-readable medium of claim 18, wherein the second free-form action and the first free-form action comprise marks made by the user on a display of the device.

21. The non-transitory machine-readable of claim 17, wherein the determining is based, in part, on whether the user device is a mobile device or a laptop.

22. The non-transitory machine-readable of claim 18, wherein when the second free-form action does not match the free-form action, the operations further comprise:
   requesting the user to perform a third free-form action to repeat the first free-form action.

23. The non-transitory machine-readable of claim 18, wherein when the second free-form action does not match the free-form action, the operations further comprise:
   requesting the user to perform and repeat a free-form action.

\* \* \* \* \*